(12) United States Patent
Moore

(10) Patent No.: US 9,733,052 B2
(45) Date of Patent: Aug. 15, 2017

(54) MANUFACTURING PROCESS TO PRODUCE METALURGICALLY PROGRAMMED TERMINAL PERFORMANCE PROJECTILES

(71) Applicant: VISTA OUTDOOR OPERATIONS LLC, Clearfield, UT (US)

(72) Inventor: Scott E. Moore, Elk River, MN (US)

(73) Assignee: Vista Outdoor Operations LLC, Farmington, UT (US)

(*) Notice: Subject to any disclaimer, the term of this patent is extended or adjusted under 35 U.S.C. 154(b) by 0 days.

(21) Appl. No.: 15/175,951

(22) Filed: Jun. 7, 2016

(65) Prior Publication Data

US 2017/0131079 A1  May 11, 2017

Related U.S. Application Data

(63) Continuation of application No. 14/214,780, filed on Mar. 15, 2014, now Pat. No. 9,360,284.

(60) Provisional application No. 61/792,030, filed on Mar. 15, 2013, provisional application No. 61/792,419, filed on Mar. 15, 2013.

(51) Int. Cl.
*F42B 5/26* (2006.01)
*F42B 5/30* (2006.01)
*F42B 33/00* (2006.01)
*F42B 12/78* (2006.01)
*F42B 33/14* (2006.01)

(52) U.S. Cl.
CPC ............ *F42B 33/001* (2013.01); *F42B 12/78* (2013.01); *F42B 33/14* (2013.01)

(58) Field of Classification Search
CPC ......... F42B 33/001; F42B 33/14; F42B 12/78
USPC .................................................. 102/464, 514
See application file for complete search history.

(56) References Cited

U.S. PATENT DOCUMENTS

| | | | | |
|---|---|---|---|---|
| 2,309,360 | A * | 1/1943 | Southwell .............. | B21K 1/025 102/516 |
| 4,151,014 | A * | 4/1979 | Charschan ............... | C22F 3/00 148/433 |
| 4,304,978 | A * | 12/1981 | Saunders ................. | C21D 1/09 219/121.12 |
| 4,467,168 | A * | 8/1984 | Morgan ................ | C03B 33/082 219/121.67 |
| 9,329,009 | B1 * | 5/2016 | Moore .................... | F42B 33/00 |
| 9,360,284 | B1 * | 6/2016 | Moore .................... | F42B 33/00 |
| 2008/0184873 | A1 * | 8/2008 | Martini Filho ......... | F42B 5/025 86/1.1 |

* cited by examiner

*Primary Examiner* — Samir Abdosh
(74) *Attorney, Agent, or Firm* — Christensen, Fonder, Dardi & Herbert PLLC

(57) ABSTRACT

The present invention in some aspects is directed to small arms ammunition and programmed upset characteristics thereof imparted to them using high energy beams. More particularly, the invention relates to ammunition and methods of making ammunition having predetermined patterns of engraving and/or cutting or hardening and/or annealing imparted in the ammunition's forward portion using a programming laser or electron beam system adapted for treating projectiles to effect predetermined and consistent upset configurations.

22 Claims, 4 Drawing Sheets

MANUFACTURING PROCESS TO PRODUCE METALURGICALLY PROGRAMMED TERMINAL PERFORMANCE PROJECTILES

CROSS-REFERENCE TO RELATED APPLICATIONS

The present application is a continuation of U.S. patent application Ser. No. 14/214,780, filed Mar. 15, 2014, which claims the benefit of U.S. Provisional Patent Application No. 61/792,030, filed Mar. 15, 2013, and of U.S. Provisional Patent Application No. 61/792,419, filed Mar. 15, 2013, all of which are incorporated herein by reference in their entireties.

FIELD OF THE INVENTION

The present invention relates to small arms ammunition and programmed upset characteristics thereof imparted to them using lasers and/or electron beams. More particularly, the invention may include ammunition and methods of making ammunition having predetermined patterns of engraving and/or cutting imparted to the ogive and meplat regions using lasers and/or electron beams to effect predetermined and consistent upset configurations. The invention may include ammunition and methods of making ammunition having predetermined patterns of hardening and/or annealing imparted to the ogive and/or meplat regions and/or core using lasers and/or electron beams to effect predetermined and consistent upset configurations.

BACKGROUND OF THE INVENTION

Jacketed bullets are well known in the art. Shaping and scoring the tips of bullets and the core or body can provide programmed performance in the sense of petaling or fragmenting upon impact. Such is typically done with suitable dies and machine tools which have repeatable performance but little flexibility, often multiple steps, and certainly the need to retool when a different cut or score pattern is desired.

Prior methods of manufacturing a bullet include those described in U.S. Pat. Nos. 7,171,905, 7,162,942, 5,943,749, 5,131,123, and those cited therein and referenced thereby. All of which are incorporated by reference in their entireties.

It would be desirable to provide ammunition and methods of making ammunition having predetermined and consistent upset configurations, wherein the method of manufacturing is efficient, consistent and flexible and involves fewer steps.

SUMMARY OF THE INVENTION

The present invention in some aspects may include small arms ammunition and programmed upset characteristics thereof imparted to them using high energy beams, including lasers and/or electron beams. More particularly, the invention relates to ammunition and methods of making ammunition having predetermined patterns of engraving and/or cutting imparted to the forward end, such as the ogive and meplat regions, into and/or through the jacket using lasers and/or electron beams to effect predetermined and consistent upset configurations. It also relates to ammunition and methods of making ammunition having predetermined patterns of hardening and/or annealing imparted to the ogive and meplat regions using lasers and/or electron beams to effect predetermined and consistent upset configurations.

In some aspects of the invention, lasers and/or electron beams may be used in forming steps of the bullet core to provide petaling or other performance objectives before or after jacketing or without jacketing. The bullet core may be imparted with patterns of engraving, cutting, hardening or annealing, or combinations thereof, to provide performance objectives before or after jacketing or without jacketing. This may include cutting and/or engraving patterns into the core to produce a cohesive differentiation between portions of the core or hardening and/or annealing patterns into the core to produce a hardness differentiation between portions of the core, or combinations thereof.

According to an aspect of the present invention that may be included, terminal performance in regard to bullet upset upon contact with a target may be pre-programmed through the selective laser and/or electron beam treatment. This treatment may include performing selective laser and/or electron beam cutting, engraving and/or combinations thereof of a given pattern upon the meplat and/or ogive of a metallic jacketed bullet. The selective laser treatment of the present invention may be accomplished through the use of a scanning laser system adapted for treating bullets. The selective electron beam treatment of the present invention may be accomplished through the use of an electron beam system adapted for treating bullets. By programming the laser and/or electron beam system for laser and/or electron beam treating jackets following specific pattern applications, the user may pre-program the resulting bullets to exhibit certain terminal performance characteristics.

According to an aspect of the present invention the may be included, terminal performance in regard to bullet upset upon contact with a target may be pre-programmed through the selective heat treatment, that being annealing, hardening and combinations thereof, using laser and/or electron beam treatment. This treatment may include performing selective laser and/or electron beam annealing, hardening and/or combinations thereof of a given pattern upon the meplat and/or ogive of a metallic jacketed bullet. The selective heat treatment of the present invention is accomplished through the use of a conventional scanning laser system sized and adapted for treating bullet jackets. The selective electron beam heat treatment of the present invention may be accomplished through the use of an electron beam system adapted for treating bullets. By programming the laser and/or electron beam system for laser and/or electron beam treating jackets following specific pattern applications, the user may pre-program the resulting bullets to exhibit certain terminal performance characteristics.

In some aspects, the present invention is directed to a method of forming a bullet comprising:
 a) forming cup shaped jacket blank;
 b) providing a core;
 c) inserting the core into the jacket and forming the bullet;
 d) providing a scanning laser and/or electron beam system capable of finely cutting and/or engraving specific patterns in bullet material; and
 e) laser cutting and/or laser engraving or electron beam cutting and/or electron beam engraving the front end portion of the jacket with a beam emitted from the scanning laser and/or electron beam system in the shape of a predetermined pattern onto the jacket blank wall, the predetermined pattern symmetrical about an axis of the bullet.

In some aspects, the present invention is directed to a method of forming a jacketed bullet having a front end portion, comprising:
 a) forming cup shaped jacket blank;
 b) providing a core;
 c) inserting the core into the jacket and forming the bullet;

d) providing a scanning laser and/or electron beam system capable of annealing, hardening and/or other heat treating specific patterns in bullet material; and
e) laser and/or electron beam annealing, hardening and/or other heat treating the front end portion of the jacket with a beam emitted from the laser and/or electron beam system in the shape of a predetermined pattern onto the jacket blank wall, the predetermined pattern symmetrical about an axis of the bullet.

In some aspects, the present invention is directed to a method of forming a bullet comprising:
a) forming a jacket blank;
b) providing a core;
c) inserting the core into the jacket and
d) laser and/or electron beam cutting or engraving through the jacket into the core at least 30% of a diameter of the bullet; and
e) shaping the bullet.

In some aspects, the present invention is directed to a method of forming a bullet comprising:
a) forming a jacket blank with a forward end;
b) laser and/or electron beam cutting or engraving the forward end of the jacket blank;
c) providing a core;
d) inserting the core into the jacket and
e) shaping the bullet.

In some aspects, the present invention is directed to a method of forming a bullet comprising:
a) forming a jacket blank with a forward end;
b) providing a core;
c) laser and/or electron beam cutting or engraving the core in a pattern symmetrical about an axis
d) inserting the core into the jacket and
e) shaping the bullet.

In some aspects, the present invention is directed to a method of forming a bullet comprising:
a) providing a jacket blank with a forward end;
b) providing a core;
c) laser and/or electron beam cutting or engraving the core in a pattern symmetrical about an axis
d) inserting the core into the jacket and
e) shaping the bullet.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser and/or an electron beam system capable of finely cutting and/or engraving specific patterns in the sheet metal blank material; and
e) laser and/or electron beam cutting the cup shaped jacket blank at the bottom with a beam emitted from the scanning laser and/or electron beam system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser and/or electron beam system capable of finely cutting and/or engraving specific patterns in the sheet metal blank material; and
e) laser and/or electron beam engraving the cup shaped jacket blank at the bottom with a beam emitted from the scanning laser and/or electron beam system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser and/or electron beam system capable of finely annealing and/or hardening specific patterns in the sheet metal blank material; and
e) laser and/or electron beam annealing the cup shaped jacket blank at the bottom with a beam emitted from the scanning laser and/or electron beam system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser and/or electron beam system capable of finely annealing and/or hardening specific patterns in the sheet metal blank material; and
e) laser and/or electron beam hardening the cup shaped jacket blank at the bottom with a beam emitted from the scanning laser and/or electron beam system in the shape of a predetermined pattern into the cup shaped jacket blank wall.

Some aspects of the present invention include a jacketed bullet made by the methods above and herein and a cartridge comprising such jacketed bullets.

Still further, the method may comprise the further step of forcing a first end of the cup shaped jacket blank containing the core against the bottom of the cup shaped jacket blank into a concave cavity of a forming tool to deform the end of the cup shaped jacket blank into an ogival front end portion of the bullet in order to shape the bullet. The bullet may also be crimped to lock it in place and ensure that the core remains inserted within the first end of the cup shaped jacket blank. Additionally, the method may include the further step of forming a hollow at a center portion of the bottom of the cup shaped jacket blank.

In certain aspects of the invention, the core may be made from a malleable metal. Examples of suitable materials include lead, lead alloy, tungsten, tungsten alloys, carbon, carbon fiber, metal containing composites, and alloys and combinations thereof.

In some aspects, the jacket material may be of metal. Examples of suitable materials include brass alloy, copper, copper alloy, aluminum, zinc alloys, carbon and alloys and combinations thereof.

In some aspects of the invention methods disclosed, the laser and/or electron beam hardening includes the step of: directing a beam onto the surface of the cup shaped jacket blank in the shape of the pattern at sufficiently high power densities to cause an incandescent reaction above the cup shaped jacket blank melting temperature with the cup shaped jacket blank; and limiting the incandescent reaction at a given area of the cup shaped jacket blank surface to a sufficiently short period of time to prevent any substantial melting.

In some aspects, the methods include the additional step of pre-conditioning the cup shaped jacket blank prior to the laser directing step by black oxide coating the surface of the cup shaped jacket blank which is absorbtive of the wavelength of the laser beam.

In some aspects, the methods of annealing and/or hardening include the additional step of quenching the cup shaped jacket blank with a gaseous jet.

In some aspects, the methods include the additional step focusing a laser beam into a narrow line where it intersects the cup shaped jacket blank; and traversing the beam along the cup shaped jacket blank with the beam line oriented in a direction generally perpendicular to the tangent of the targeted surface point.

In some aspects, the methods include the additional step focusing an electron beam into a narrow line where it intersects the cup shaped jacket blank; and traversing the beam along the cup shaped jacket blank with the beam line oriented at an acute angle to the tangent of the targeted surface point.

In still further aspects of the invention there is included a method of heat treating a jacket for a jacketed bullet made of a transformation hardenable material without substantial distortion. Such method comprising the steps of: providing a metal blank, wherein the metal blank is made from a material suitable for use as cartridge bullet jackets; directing a laser and/or electron beam to the outside surface of the metal blank at sufficiently high power densities so as to cause a substantially instantaneous incandescent reaction above the melting temperature of the material with the metal blank; and traversing the beam along the outside surface of the metal blank in a predetermined pattern, whereby a heat-treated pattern in the shape of the predetermined pattern is formed on the metal blank, limiting the dwell time of the beam at any given point on the surface of the metal blank to prevent any substantial melting of the metal blank, wherein the metal blank is shaped into a cup shape having an ogival front end portion and formed for suitable use in a jacketed bullet.

In an aspect of the invention, the bullet being formed can have an added layer or layers of material that is particularly amenable to heat treating processes, for example ferrous based alloys or other alloys. The layer in the bullet can have a cap or jacket. In some embodiments, the cap layer may be below the copper or copper alloy jacket permitting the isolated regional heat treatment of the cap even though visually the cap or layer of material is not directly, visually, exposed. In an embodiment, the invention includes the selection of heat treatable alloys that are particularly amendable to heat treating, providing said alloy in a form near or at the surface of the bullet so that it is exposable to laser and/or electron beam heating, and laser and/or electron beam heating the bullet.

In an aspect of the invention, the bullet being formed can have an added layer or layers of material welded together as part of the heat treatment process. This is particularly advantageous where layers do not necessary bond together well and may be subject to premature separation. Isolated heating to weld the layers together precludes the premature delamination and permit, for example, use of thinner layers.

In aspects of the invention, heat treating bullets may be supplemented with laser and/or electron beam heat treating. For example in a process where bullets are heated and cooled for particular process times, discrete regional areas on the bullet may be provided with differential heating from the ambient conditions and the "gross" heating conventionally imparted to the bullets by wide spread radiant or convective heating.

The heat treating may be controlled by control processors (computers) and accompanying equipment necessary to perform the controlled heating, such as described in the references incorporated by reference and those commercially available devices known to those skilled in the art.

The present invention further includes aspects such as jacketed bullets having jackets treated by the methods disclosed herein, cartridges comprising such jacketed bullets and jacketed bullets comprising a jacket and a core, wherein the jacket is cup shaped and the core is positioned within the jacket and wherein the jacket is and/or electron beam cut with a cut pattern. Further aspects include a jacketed bullet comprising a jacket and a core, wherein the jacket is cup shaped and the core is positioned within the jacket and wherein the jacket is and/or electron beam engraved with an engraved pattern.

The present invention further includes aspects such as jacketed bullets having jackets treated by the methods disclosed herein, cartridges comprising such jacketed bullets and jacketed bullets comprising a jacket and a core, wherein the jacket is cup shaped and the core is positioned within the jacket and wherein the jacket is laser and/or electron beam annealed with a laser and/or electron beam annealed pattern. Further aspects include a jacketed bullet comprising a jacket and a core, wherein the jacket is cup shaped and the core is positioned within the jacket and wherein the jacket is laser and/or electron beam hardened with a laser and/or electron beam hardened pattern.

The methods disclosed herein utilizing a laser system for cutting, engraving, annealing and/or hardening may include, directing the laser beam at the surface of a jacketed bullet, a jacket blank and/or a core at a position consistent with the desired pattern and at an angle which is perpendicular (90°) to the tangent of the targeted surface point. The beam follows the preprogrammed pattern on the surface of the target, maintaining the 90° angle.

The methods disclosed herein utilizing an electron beam system for cutting, engraving, annealing and/or hardening may include, directing the electron beam at the surface of a jacketed bullet, a jacket blank and/or a core consistent with the desired pattern and at an angle. The beam follows the preprogrammed pattern on the surface of the target. The electron beam may be directed at the bullet at various angles, perpendicular or acute, relative to the tangent of the specific surface point that is being targeted.

In some aspects, the predetermined patterns created by the methods or exhibited by the bullets herein may be in the form of a multipoint star, such as a 4 point star, a 5-point star, or an "X".

In other embodiments, the core of a bullet or an unjacketed bullet may be laser and/or electron beam cut to provide petaling guides extending deep into or through the bullet. The traditional steps of punching and swaging or coning may be reduced or minimized by using a laser and/or electron beam for shaping cutting purposes. The precise cutting provided by a laser and/or electron beam can improve quality control and consistent performance over traditional punching and forming methods. This can provide better accuracy.

In an aspect of the invention, the bullet being formed can have an added layer or layers of material that is particularly amenable to laser and/or electron beam cutting, for example alloys that have specific fillers. The layer bullet can have a cap or jacket.

The aspects and embodiments of the present invention are advantageous due to the flexibility they provide in dictating terminal performance. They provide the ability of promoting, controlling and designing for consistent predetermination of mushrooming and/or fragmentation of a jacketed bullet, which is desirable to the end user. The invention provides for faster and more consistent preparation of jackets with desired features. Automated control of laser and/or electron beam equipment provides easy change of cutting or other application patterns, including depths, thicknesses, etc. without changing tooling. Manufacturing equipment may be replaced or more easily altered for new designs than conventional methods, such as altering jacket thickness, skiving, altering hardness and core material. The flexibility and simplicity in which jackets and cores and combined jackets and cores may be tailored translates into reduced costs. The present invention provides for methods that give the user a greater choice of controlled expanding or mushrooming small caliber bullets. The manufacturing methods provides for a more consistency in dependable and predictable expanding bullets. The methods herein provide for an easier and quicker way of moving from one design to another.

The above summary of the various representative aspects of the invention is not intended to describe each illustrated aspect or every implementation of the invention. Rather, the aspects are chosen and described so that others skilled in the art can appreciate and understand the principles and practices of the invention. The figures in the detailed description that follow more particularly exemplify these aspects.

Still other objects and advantages of the present invention and methods of construction of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

BRIEF DESCRIPTION OF THE DRAWINGS

The invention can be completely understood in consideration of the following detailed description of various aspects of the invention in connection with the accompanying drawings, in which.

Figure 1:
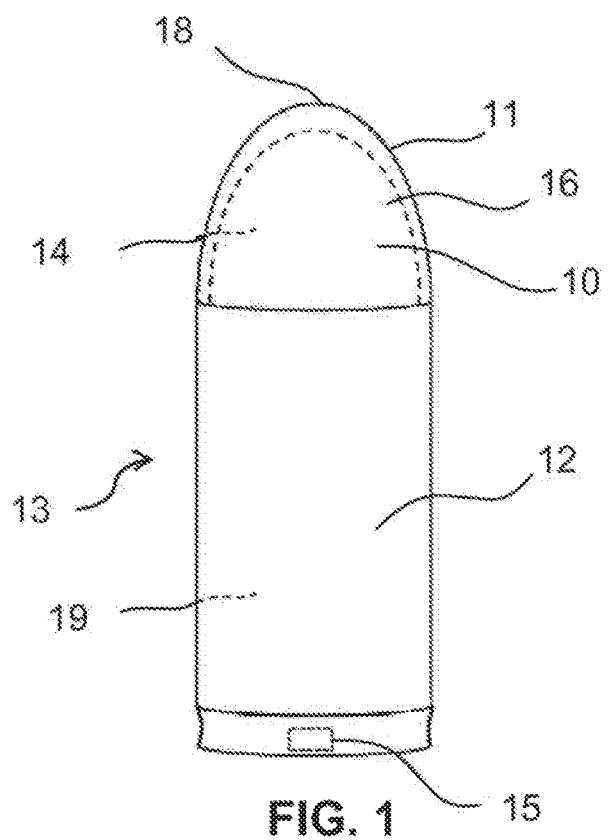
FIG. 1 is a side view of a cartridge with certain aspects in phantom according to certain aspects of the present invention.

While the present invention is amenable to various modifications and alternative forms, specifics thereof have been shown by way of example in the drawings and will be described in detail. It should be understood, however, that the intention is not to limit the present invention to the particular aspects described. On the contrary, the intention is to cover all modifications, equivalents, and alternatives falling within the spirit and scope of the present invention as defined by the appended claims.

DETAILED DESCRIPTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated. The figures are used for both cutting or engraving and heat treating via annealing or hardening.

The present disclosure includes ammunition and methods of making ammunition having predetermined patterns of engraving and/or cutting imparted to the ogive and meplat regions and/or core using lasers and/or electron beams to effect predetermined and consistent upset configurations. It may also include ammunition and methods of making ammunition having predetermined patterns of hardening and/or annealing imparted to the ogive and meplat regions using lasers and/or electron beams to effect predetermined and consistent upset configurations.

The predetermined patterns may be incorporated via selective laser and/or electron beam treatment. The selective laser treatment of the present invention is accomplished through the use of a scanning laser system adapted for treating bullet jackets. The selective electron beam treatment of the present invention may be accomplished through the use of an electron beam system adapted for treating bullets. By programming the systems for laser and/or electron beam treating jackets following specific pattern applications, the user may pre-program the resulting bullets to exhibit certain terminal performance characteristics. Such patterns may be altered from bullet to bullet and batch to batch.

Figure 2:
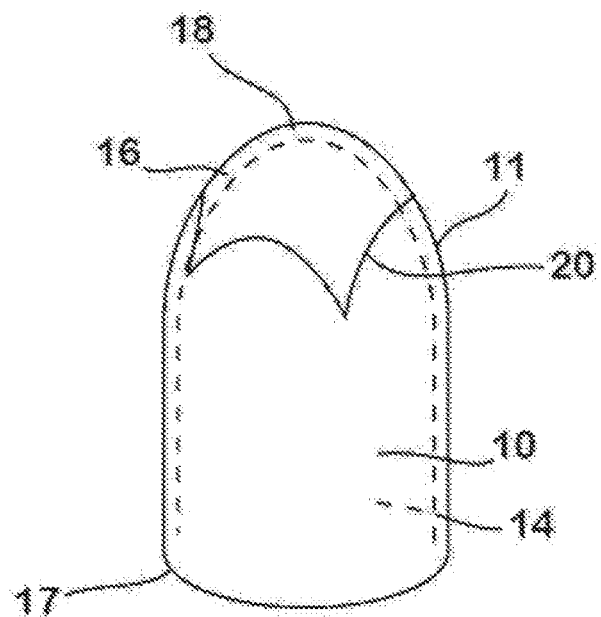
FIG. 2 is a side perspective view of a bullet with certain aspects in phantom according to certain aspects of the present invention.
Figures 3A, 3B, 3C:
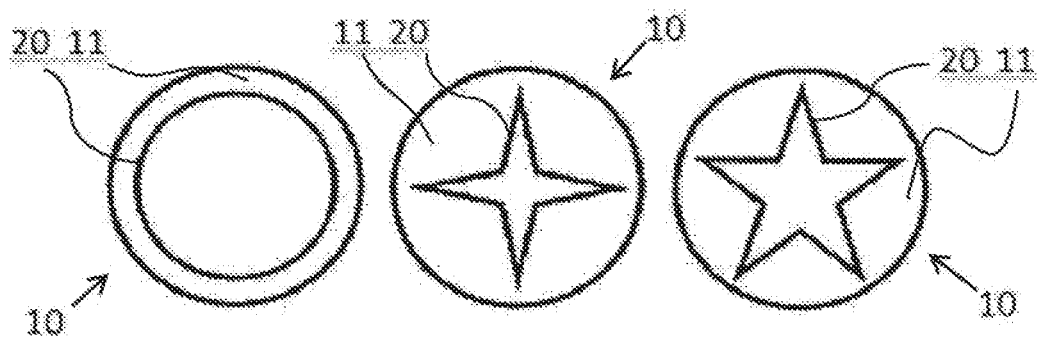
FIGS. 3A-3I are top side views of bullets with certain patterns according to certain aspects of the present invention.
Figures 3D, 3E, 3F:
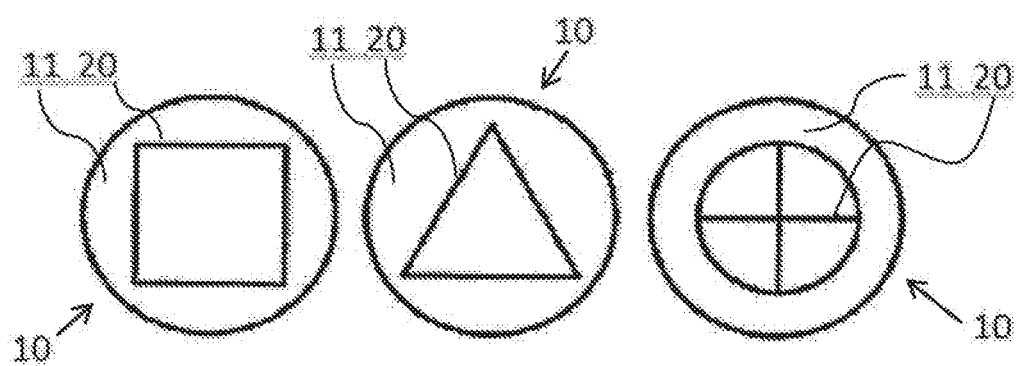
Figures 3G, 3H, 3I:
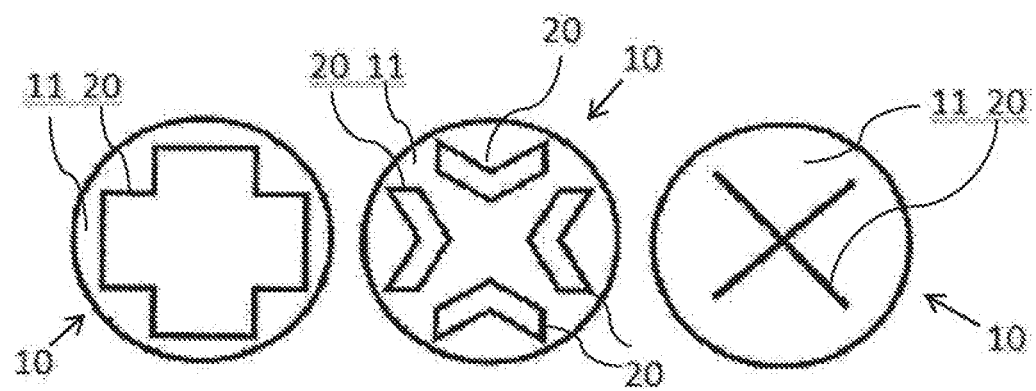

FIGS. 1 and 2 illustrate aspects of the present invention. In FIG. 1, there is shown a perspective view of a conventional jacketed bullet 10 loaded into a cartridge case 12 to form a cartridge 13. A cartridge (also called a round, a shell, a projectile or ammunition) packages a bullet 10, propellant (usually either smokeless powder or black powder) and a primer within a metallic, or plastic cartridge casing 12 that is precisely made to fit within the firing chamber of a firearm. The primer 15 may be positioned at the bottom of the casing 12, with the propellant 19 positioned within the casing 12, between the bullet 10 and the primer 17. The cartridge 13 and bullet 10 of the present invention may comprise various designs. As such, this figure shall not be considered limiting, as it is used for general illustrative purposes.

Jacketed bullet 10 includes a jacket 11 which has a generally cylindrical body portion, a generally ogival front end portion 16, and a hollow open recess or cavity. The hollow open recess or cavity typically contains a core 14 (shown in phantom lines), which is preferably formed of a malleable metal or a composite comprising metal. The jacket 11 covers at least a major portion of the core body portion 14, including the ogival front end portion 16. At the base or rear end 17 of the bullet 10, the jacket 11 may cover the entire core 14 or it may cover a portion, leaving an opening in the base 17. The present invention also contemplates hollow point bullets which include a hollow open cavity at point 18 in the jacket 11. The jacket 11 may be made of suitable material, including, but not limited to, a malleable metal such as a copper or copper alloys. Such combinations of jacket and core are well known in the art and well within the knowledge and abilities to design and make of one skilled in the art.

FIG. 2 shows an isolated perspective view of the jacketed bullet 10 with an aspect of the cutting or engraving and/or the annealing or hardening pattern 20 of the invention shown imparted to the jacket 11. The front end portion 16 is shown as ogival in shape, but it should be understood that the front end portion may vary in shape and fall within the aspects of the present invention. The cavity housing the core 14 may have a curved profile or may have a generally conical profile having a straight sidewall. The choice depends on the caliber and the precision of the tooling necessary to form the cavity.

Figure 4:
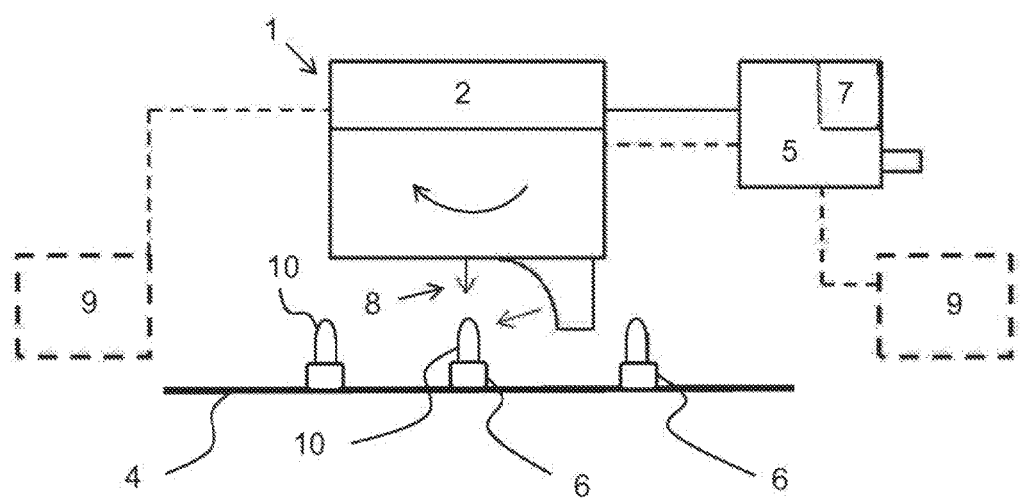
FIG. 4 is a block diagram of a laser system in accordance with the inventions herein.

According to the present invention, selective laser treatment may be used for the cutting, engraving and combinations thereof of a given pattern upon the meplat and/or ogive of a metallic jacketed bullet. The selective laser treatment of the present invention may be accomplished through the use of a scanning laser system adapted for treating bullet jackets and cores. FIG. 4 illustrates a laser system 1 having a laser machine 2, conveyance equipment 4, a control processor (computer) 5 with memory 7, and bullet fixtures 6. The laser machine 2 is arranged to provide the cutting or engraving laser beam 8 around and directed at the tip of the bullet 10. The laser beam system 1 may be constructed to allow for alignment of the laser beam 8 and the bullets 10 with three degrees of movement, as indicated by the arrows in FIG. 4.

Figure 6:
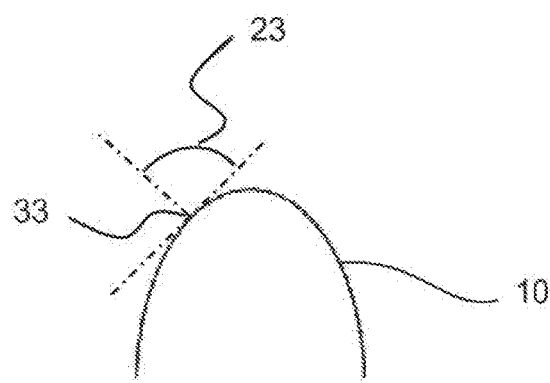
FIG. 6 is a partial side view of a bullet illustrating an angle of treatment.

When firing, the laser beam is directed at the surface of a jacketed bullet 10 at a position consistent with the desired pattern and at an angle 23, as shown in FIG. 6, which is perpendicular (90°) to the tangent of the targeted surface point 33 of the bullet 10. The beam follows the preprogrammed pattern on the surface of the target, maintaining the 90° angle. The use of the laser machine 2 allows instant variation in cutting or other application patterns of bullets 10 without the need for retooling. Conveyance of bullets 10 in fixtures 6, operating of the laser system laser machine 2 and equipment, as well as cutting or other application patterns are controlled by the control processor and patterns may be stored in the memory 7. The control processor 5 may control other forming, handling, and packaging equipment as illustrated by the dashed lines 9. By programming the laser system for laser treating jackets following specific pattern applications, the user may pre-program the resulting bullets to exhibit certain terminal performance characteristics.

According to the present invention, the scanning laser system illustrated above may also be and used in the selective laser treatment of annealing and/or hardening of patterns in the bullet jackets and/or cores as further described herein. The laser beam machine 2 is configured and adjusted to provide the annealing and/or hardening electron beam 8 around and directed at the tip of the bullet 26 or at the predetermined position on the jacket and/or core. Adjustments would be well within the abilities of those skilled in the art.

Selective cutting and/or engraving and combinations thereof may also be accomplished using an electron beam system. Through a selective electron beam treatment, that being cutting, engraving and combinations thereof, of a given pattern upon the meplat and/or ogive of a metallic jacketed bullet, terminal performance in regard to bullet upset upon contact with a target may be pre-programmed. The selective electron beam treatment may be accomplished through the use of an electron beam machine adapted for treating bullet jackets.

Figure 5:
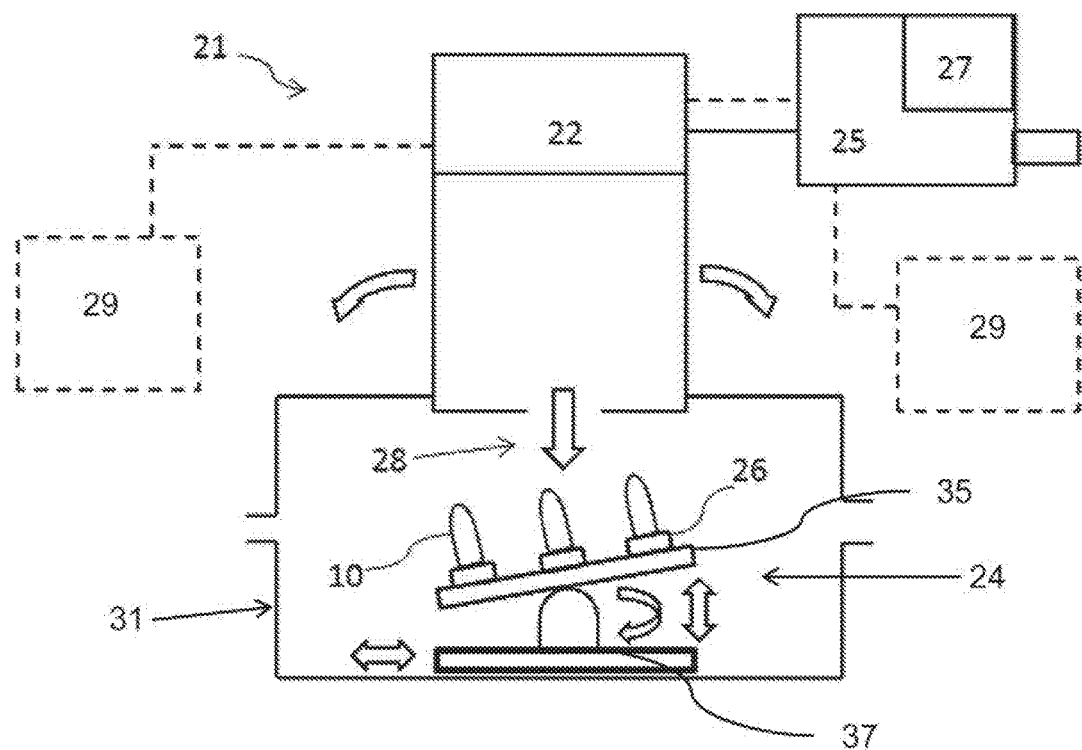
FIG. 5 is a block diagram of an electron beam system in accordance with the inventions herein.

FIG. 5 illustrates and electron beam system 21 having an electron beam machine 22, mounting and positioning equipment 24 inside a chamber 31, which may be a vacuum chamber 31, for positioning the substrate bullet(s) at the desired angle of application, a control processor (computer) 25 with memory 27, and bullet fixtures 26 holding the bullets 10. The electron beam machine 22 is arranged to provide the cutting or engraving electron beam 28 around and directed at the tip of the bullet 26. The use of the electron beam machine 22 allows instant variation in cutting or other application patterns of bullets without the need for retooling. Positioning of bullets 10 in fixtures 26, operating of the equipment, as well as cutting or other application patterns are controlled by the control processor 25 and patterns may be stored in the memory 27. The control processor 25 may control other forming, handling, and packaging equipment as illustrated by the dashed lines 29. By programming the electron beam machine in an electron beam system for treating jackets and/or cores following specific pattern applications, the user may pre-program the resulting bullets to exhibit certain terminal performance characteristics.

The electron beam system 21 may be constructed to allow for alignment of the electron beam 28 and the bullets 10 with three degrees of movement. The arrows of FIG. 5 represent freedoms of motion that may be incorporated in the electron beam system 21. The electron beam machine 22 may be adjustable to vary the angle of the electron beam 28. The mounting and positioning equipment 24 may comprise one or more trays 35, which may hold or include one or more fixtures 26, and an adjustable base 37 that is connected to the tray 35 and may raise, tilt, rotate and laterally move the tray 35. The electron beam 28 and the bullets 10 may thereby be movable relative to one another.

The tray 35 and/or the entire mounting and positioning equipment 24 may be removably positioned within the chamber 31 and the chamber may include access and removal paths for the insertion and removal and/or conveyance of trays 35 of bullets 10. The chamber 31 may include mounting and positioning equipment 24 that includes multiple adjustable bases 37 and trays 35 that may be positionable within the chamber 31. Positioning of the mounting and positioning equipment 24 and bullets 10, operating of the electron beam machine 22, chamber 31 and equipment, as well as cutting or other application patterns are controlled by the control processor 25.

In application, the electron beam is directed at the surface of a jacketed bullet 10 at a position consistent with the desired pattern and at an angle 23, as shown in FIG. 6. The beam follows the preprogrammed pattern on the surface of the target. The electron beam 28 may be directed at the bullet 10 at various angles 23 relative to the tangent of the specific surface point 33 of the bullet 10 that is being targeted for cutting or engraving. As such, the angle of the cut or engraving may be tailored. The angle 23 of firing may be an angle that is perpendicular (90°) to the tangent of the targeted surface point 33 or may be and acute angle (<90°) so as to provide a cutting or engraving that is at an acute angle relative to the tangent of the targeted surface point 33 of the bullet 10. The angle 23 may be between about 22° and about 80°. The angle 23 may be between about 22° and about 68°. The angle 23 may be between about 45° and about 80°. The angle 23 may be between about 40° and about 70°. The angle 23 may be between about 45° and about 70°. The angle 23 may be about 45°.

According to the present invention, the electron beam system illustrated above may also be used in the selective electron beam treatment of annealing and/or hardening of patterns in the bullets jackets and/or cores as further described herein. The electron beam machine 22 is configured and adjusted to provide the annealing and/or hardening electron beam 28 around and directed at the tip of the bullet 26 or at the predetermined position on the jacket and/or core. Adjustments would be well within the abilities of those skilled in the art.

In certain aspects of the invention, the jacket 11 is laser and/or electron beam treated by imparting on and in the material of the jacket 11 patterns of cutting or engraving. Non-limiting examples of patterns are shown in FIGS. 3A-3I. It should be understood that the present invention also contemplates using the present methods of laser and/or electron beam cutting and/or engraving the jacket to duplicate any pattern of cutting, scoring or weakening the jacket currently within the field of art. Further uses are addressed below. The laser and/or electron beam cutting and/or engraving of the present invention may be done before the jacket 11 material is swaged into its final form or after. The patterns may also be imparted after the core 14 is inserted and even after the jacket/core is fitted with a cartridge case.

The laser and/or electron beam engraving and/or cutting of jackets 11 following each of the patterns shown in FIGS. 3A-3I may result in a different terminal performance in regard to bullet upset upon contact with a target. The engraving and/or cutting may create lines of demarcation from which petals are formed upon upset. As such, criteria such as penetration, weight loss or fragmentation of the core upon upset, proper petal expansion and performance through barrier materials, and damage may be readily programmed by specifying certain patterns. The use of lasers and/or electron beams affords greater flexibility in pattern choice and provides accuracy, consistency and reliability. Upset may also depend on other factors, such as projectile velocity and particular jacket alloy characteristics. As such, the present invention further includes the cutting/engraving of patterns in the jacket in combination with the choosing of certain jacket alloys and projectile velocities. In embodiments, the bullets may be swaged or pressed after cutting or engraving with the laser.

In some aspects of the present invention, a method of forming the jacketed bullet 10 in accordance with the invention having an ogival front end portion 16 comprises the steps of:

a) drawing and providing a sheet metal blank made of a material suitable for use as ballistic cartridge jackets into a cup shaped jacket blank having a flat bottom and a generally uniform thickness wall;

b) forming a malleable metal core in the cup shaped jacket blank against said bottom by swaging or molding the core directly into the blank;

c) providing a laser and/or electron beam system capable of finely cutting and/or engraving specific patterns in the material;

d) cutting and/or engraving the jacket material at the bottom with the laser and/or electron beam system in the shape of a predetermined pattern into the jacket wall; and e) forcing the end of the blank containing the core against the bottom of the blank into a concave cavity of a forming tool to deform the end of the blank into an ogival front end portion 16 of the bullet 10.

Finally, the rear end 17 of the blank is crimped over the rear of the core 14 to lock it in place and ensure that the core 14 remains inserted within the front end 16 of the jacket 11.

In some aspects, the jacket cup may be first coated with a coating conventionally used in bullet manufacturing. In addition, although in certain aspects of the invention the jacket material is substantially uniform in thickness, the jacket wall may have a thickened sidewall and bottom to vary the upset performance.

In embodiments, the jackets may be cut and/or engraved prior to the step of joining the jacket to the core. Such prejoining cutting can allow more precise cutting and/or engraving through patterning of the jacket without disruption of the underlying core material. Subsequent swaging or pressing can create specific surface designs where the core material is exposed in precise patterns or designs, including indicia or markings.

In embodiments, the core material may be laser cut prior to being jacketed. This can provide cuts and/or engravings that may be a guide for petaling, allowing for the skipping or simplifying of discrete steps, for example coning or swaging. In other embodiments, deep cutting and/or engraving may be made through the jacket and core. In such instances the bullet may be re-coned or swaged to close gaps.

Laser and/or electron beam cutting in the context of the present invention can mean completely separating the material along a line or cutting into the material a depth of more than 0.050 inches, for example. Laser and/or electron beam engraving in the context of the present invention can mean scoring or cutting at the surface through only a selective portion of the material thickness, less than 0.100 inches, for example.

Prior to jacketing, the core may be cut to provide radial segments at its ogive end to conform to formed petals in the jacket. The radial segments and petals may alternatively be formed at the same time after jacketing.

In certain aspects of the invention, the jacket 11 is laser and/or electron beam treated by imparting on and in the material of the jacket 11 patterns of annealing or hardening. As with the cutting and/or engraving, non-limiting examples of patterns are shown in FIGS. 3A-3I. It should be understood that the present invention also contemplates using the present methods of laser and/or electron beam annealing and/or hardening the jacket to duplicate any pattern of cutting, scoring or weakening the jacket currently within the field of art. The laser and/or electron beam annealing and/or hardening of the present invention may be done before the jacket 11 material is swaged into its final form or after. The patterns may also be imparted after the core 14 is inserted and even after the jacket/core is fitted with a cartridge case.

The laser and/or electron beam hardening and/or annealing of jackets 11 following each of the patterns shown in FIGS. 3A-3I may result in a different terminal performance in regard to bullet upset upon contact with a target. The hardening and/or annealing may create lines of demarcation from which petals are formed upon upset. As such, criteria such as penetration, weight loss or fragmentation of the core upon upset, proper petal expansion and performance through barrier materials, and damage may be readily programmed by specifying certain patterns. Upset may also depend on other factors, such as projectile velocity and particular jacket alloy characteristics. As such, the present invention further includes the annealing/hardening of patterns in the jacket in combination with the choosing of certain jacket alloys and projectile velocities. In embodiments, the bullets may be swaged or pressed after annealing or hardening with the laser and/or electron beam.

Annealing, in metallurgy and materials science, is a heat treatment that alters a material to increase its ductility and to make it more workable. It involves heating material to above its critical temperature, maintaining a suitable temperature, and then cooling. Annealing can induce ductility, soften material, relieve internal stresses, refine the structure by making it homogeneous, and improve cold working properties.

In the cases of copper, steel, silver, and brass, this process is performed by heating the material (generally until glowing) for a while and then letting it cool to room temperature in still air. Unlike ferrous metals—which must be cooled slowly to anneal—copper, silver [1] and brass can be cooled slowly in air, or quickly by quenching in water. In this fashion, the metal is softened and prepared for further work—such as shaping, stamping, or forming.

Hardening is a metallurgical and metalworking process used to increase the hardness of a metal. The hardness of a metal is directly proportional to the uniaxial yield stress at the location of the imposed strain. A harder metal will have a higher resistance to plastic deformation than a less hard metal.

In some aspects of the present invention, a method of forming the jacketed bullet 10 in accordance with the invention having an ogival front end portion 16 comprises the steps of:
 a) drawing and providing a sheet metal blank made of a material suitable for use as ballistic cartridge jackets into a cup shaped jacket blank having a flat bottom and a generally uniform thickness wall;
 b) forming a malleable metal core in the cup shaped jacket blank against said bottom by swaging or molding the core directly into the blank;
 c) providing a laser and/or electron beam system capable of finely annealing and/or hardening specific patterns in the material;
 d) annealing and/or hardening the jacket material at the bottom with the laser and/or electron beam system in the shape of a predetermined pattern into the jacket wall; and
 e) forcing the end of the blank containing the core against the bottom of the blank into a concave cavity of a forming tool to deform the end of the blank into an ogival front end portion 16 of the bullet 10.

Finally, the rear end 17 of the blank is crimped over the rear of the core 14 to lock it in place and ensure that the core 14 remains inserted within the front end 16 of the jacket 11.

In other aspects, the jacket cup is first coated with a coating conventionally used in bullet manufacturing. In addition, although in certain aspects of the invention the jacket material is substantially uniform in thickness, the jacket wall may have a thickened sidewall and bottom to vary the upset performance.

In the embodiments, the jackets may be annealed and/or hardened prior to the step of joining the jacket to the core. Such prejoining annealing and/or hardening can allow more precision patterning of the jacket without disruption of the underlying core material. The treated jacket and/or core may then be swaged or pressed.

In embodiments, the core material can be laser annealed and/or hardened prior to being jacketed. This can provide more precision, for example for guides for petaling, and allow for skipping or minimizing discrete steps, for example coning or swaging. The core and the jacket may be annealed and/or hardened at the same time to align patterns imparted to the core and the jacket.

In some aspects of the invention methods disclosed, the laser and/or electron beam hardening includes the step of: directing a beam onto the surface of the cup shaped jacket blank in the shape of the pattern at sufficiently high power densities to cause an incandescent reaction above the cup shaped jacket blank melting temperature with the cup shaped jacket blank; and limiting the incandescent reaction at a given area of the cup shaped jacket blank surface to a sufficiently short period of time to prevent any substantial melting.

In some aspects, the methods of annealing and/or hardening include the additional step of quenching the cup shaped jacket blank with a gaseous jet.

In some aspects, the methods of annealing and/or hardening exclude an additional step of quenching directly after annealing and/or hardening.

Methods may include heat treating a jacket for a jacketed bullet made of a transformation hardenable material without substantial distortion. Such method includes comprising the steps of: providing a metal blank, wherein the metal blank is made from a material suitable for use as cartridge bullet jackets; directing a laser and/or electron beam to the outside surface of the metal blank at sufficiently high power densities so as to cause a substantially instantaneous incandescent reaction above the melting temperature of the material with the metal blank; and traversing the beam along the outside surface of the metal blank in a predetermined pattern, whereby a heat-treated pattern in the shape of the predetermined pattern is formed on the metal blank, limiting the dwell time of the beam at any given point on the surface of the metal blank to prevent any substantial melting of the metal blank, wherein the metal blank is shaped into a cup shape having an ogival front end portion and formed for suitable use in a jacketed bullet.

In the methods, the bullet being formed may have an added layer or layers of material that is particularly amenable to heat treating processes, for example ferrous based alloys or other alloys. The layer in the bullet can have a cap or jacket. In some embodiments, the cap layer may be below the copper or copper alloy jacket permitting the isolated regional heat treatment of the cap even though visually the cap or layer of material is not directly, visually, exposed. In an embodiment, the invention includes the selection of heat treatable alloys that are particularly amendable to heat treating, providing said alloy in a form near or at the surface of the bullet so that it is exposable to laser and/or electron beam heating, and laser and/or electron beam heating the bullet.

In the methods, the bullet being formed may have an added layer or layers of material welded together as part of the heat treatment process. This is particularly advantageous where layers do not necessary bond together well and may be subject to premature separation. Isolated heating to weld the layers together precludes the premature delamination and permit, for example, use of thinner layers.

Prior heat treating of the bullets may be supplemented with laser and/or electron beam heat treating. For example in a process where bullets are heated and cooled for particular process times, discrete regional areas on the bullet may be provided with differential heating from the ambient conditions and the "gross" heating conventionally imparted to the bullets by wide spread radiant or convective heating.

The present invention utilizes those suitable materials, methods and apparatuses for laser and/or electron beam cutting, engraving, hardening and annealing of material that are known to those skilled in the art. Non-limiting examples of, materials, methods and apparatuses for laser cutting, engraving, hardening and annealing of material include those references shown in:

state. Nonexclusive examples of paths and petal formation may be found in U.S. Pat. No. 6,805,057, which is incorporated herein by reference in its entirety.

The forward end of the core 14 may also include elongated paths of weakening defining core segments. In the context of the core, the paths of weakening may be in the form of radially oriented elongated paths, continuous or intermitting, of cutting, engraving, annealing or hardening, or combinations thereof, using the laser and electron beam methods disclosed herein. This may involve creating a plane of weakening, detachment or removal of material in the core, either partially or entirely radially through the core material. The paths of weakening may be radially aligned with the axis of the bullet and a cavity of the core, such a cavity included in a hollow point bullet. After applying the paths, the adjacent segments may be physically separated or in contact in a prefired resting state. Such elongated paths and segments of the core that may correspond to the elon-

| U.S. Pat. No. | U.S. Patent Publ. | U.S. Pat. No. | U.S. Pat. No. | U.S. Pat. No. |
|---|---|---|---|---|
| 6,209,459 | 20080184873 | 6,613,165 | 6,013,140 | 6,728,273 |
| U.S. Pat. No. | U.S. Pat. No. | U.S. Patent Publ. | U.S. Pat. No. | U.S. Pat. No. |
| 7,259,351 | 4,151,014 | 20130255524 | 7,932,139 | 8,304,686 |
| U.S. Patent Publ. | U.S. Pat. No. | U.S. Pat. No. | U.S. Pat. No. | U.S. Pat. No. |
| 20110208171 | 5,984,916 | 4,304,978 | 4,405,386 | 4,467,168 |
| U.S. Pat. No. | U.S. Pat. No. | U.S. Pat. No. | U.S. Pat. No. | U.S. Patent Publ. |
| 4,507,538 | 4,539,461 | 6,727,125 | 6,772,041 | 20120234810 |
| U.S. Patent Publ. | U.S. Patent Publ. | U.S. Patent Publ. | WO | U.S. Patent Publ. |
| 20090281529 | 20100087802 | 20060020259 | 2004044515A2 | 20010004868 |
| U.S. Pat. No. | U.S. Pat. No. | DE | DE | U.S. Pat. No. |
| 3,791,881 | 6,502,575 | 3825912 | 102008005098 | 5,095,821 |
| WO | DE | WO | FR | EP |
| 2005079163A2 | 2126351C1 | 2013081492A1 | 2961590A1 | 1582837A1 |

The above US patents and patent publications are incorporated by reference in their entireties.

For sake of identification, the patterns of FIGS. 3A-3I are identified as follows: 3A: circle; 3B: 4 point star; 3C: 5-point star; 3D: square; 3E: triangle; 3F: circled "X"; 3G: equilateral cross; 3H: confronting chevron; 3I: "X". It is contemplated in the present invention that the method of the present invention includes heat or laser treating patterns other than those shown, including symmetrically patterns spaced about point 18. Upon impact or upset, the patterns result in a preprogrammed formation of petals.

The present invention also includes utilizing the methods of cutting or engraving and/or annealing or hardening to impart patterns or paths of weakening into jackets and/or cores to promote and program upset characteristics.

The patterns disclosed herein may be designed to produce desired configurations. In an aspect of the invention, the ogive of a bullet 10 may include a plurality of elongated paths of weakening in the jacket extending continuously or intermittingly longitudinally from the meplat rearward toward the rear end of the ogive defining a plurality of petals circumferentially arranged around the ogive. The elongated paths may extend rearward from the forward end of the bullet to an extent necessary to achieved desired upset characteristics. The paths of weakening may be in the form of radially oriented elongated paths, continuous or intermitting, of cutting, engraving, annealing, hardening or thinning, or combinations thereof, using the laser and electron beam methods disclosed herein. This may involve creating a plane of weakening, detachment or removal of material in the jacket, either partially or entirely radially through the jacket material. After applying these paths, the adjacent petals may be physically separated or in contact in a prefired resting gated paths and petals of the jacket. Nonexclusive examples of paths and formation of segments may be found in U.S. Pat. No. 6,805,057, which is incorporated herein by reference in its entirety.

Upon impact of a fired bullet, the bullet is upset and mushroomed. The bullet collapses and expands in response to the pressure created by the impact upon the weakening features. In this process, the petals and segments are unfurled rearward. The upset bullet forms a mushroomed head and the jacket is separated along its elongated paths and exposing the core segments, which similarly are separated along their elongated paths. Nonexclusive examples of this may be found in U.S. Pat. No. 6,805,057, which is incorporated herein by reference in its entirety.

Different jacket thicknesses and alloy compositions may be utilized and different numbers of paths imparted in the jacket. Accordingly it is intended to embrace all such variations and modifications as defined by the scope of the appended claims.

In some aspects of the invention, the jacket 11 is laser treated by laser cutting patterns, including the patterns shown, into the material of the jacket. This allows the jacket to split along predetermined lines.

In some aspects of the invention, the jacket 11 is laser treated by laser engraving patterns, including the patterns shown, into the material of the jacket. This also allows the jacket to split along predetermined lines.

The present invention also contemplates using a combination of laser engraving and laser cutting to tailor the jacket for predetermined upset configurations.

In some aspects of the invention, the jacket 11 is laser heat treated by laser annealing patterns, including the patterns shown, into the material of the jacket. This allows the jacket to split along predetermined lines.

In some aspects of the invention, the jacket 11 is laser heat treated by laser hardening patterns, including the patterns shown, into the material of the jacket. This also allows the jacket to split along predetermined lines.

The present invention also contemplates using a combination of laser hardening and laser annealing to tailor the jacket for predetermined upset configurations.

It should be understood that in the methods and bullets herein, the bullet may be further modified to provide for a hollow point feature. Methods of doing so are well within the knowledge of those skilled in the art.

Examples of suitable jacket material are, but not limited to, copper, aluminum, copper alloys, aluminum alloys, brass, tin, tungsten, zinc, iron, and steel and alloys thereof and combinations thereof.

The jacket 11 on the bullet 10 of the invention may be coated with a metal oxide coating or other conventional coatings which increases the surface adhesion of the core 14 to the inner surface of the jacket 11. This promotes the flow of core 14 material outward with formation of the jacket 11 petals upon upset. Suitable coatings include, but not limited to, metal oxides.

Examples of other suitable core materials include, without limitation, materials suitable for bullet cores, such as lead, lead alloys, tin, tin alloys, tungsten, tungsten alloys, metal containing composites, copper, brass, bronze, steel, and aluminum and alloys and combinations thereof.

Suitable cartridge cases 12 include any conventional cartridge case and are readably known to those skilled in the art.

In some aspects, the bullets made by the methods herein may be non-bonded jacketed bullets, wherein the core is not bonded to the jacket. In some aspects, the bullets made by the methods herein may be bonded jacketed bullets, wherein the core is bonded to the jacket.

In some aspects, the patterns may be applied to the insider of the jacket.

The bullets of the present invention, including all of the aspects and embodiments, are adapted for mounting in a cartridge case for firing. The states of the projectiles aspects and embodiments described are unspent, unfired and pre-fired states and are undeformed and ready for conventional use.

The above references in all sections of this application are herein incorporated by references in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A method of forming a jacketed bullet having a front end portion, comprising the steps of:
   a) providing a cup shaped jacket;
   b) providing a core;
   c) inserting the core into the jacket;
   d) forming the jacketed bullet with the front end portion;
   e) providing a high energy beam system capable of directing a narrow high energy beam in specific patterns on the front end portion of the jacketed bullet; and
   f) cutting and/or engraving the front end portion of the jacketed bullet with a narrow high energy beam emitted from the high energy beam system in a shape of a first predetermined pattern, the first predetermined pattern being symmetrical about the axis of the jacketed bullet,
   wherein the cutting and/or engraving in the shape of the first predetermined pattern is controlled by using a control processor comprising an automated computer having storage and operator interface.

2. The method of claim 1, wherein the high energy beam system is one of a scanning laser system and an electron beam system.

3. The method of claim 1, wherein the cutting and/or engraving comprises cutting the front end portion of the jacketed bullet to effect an upset configuration.

4. The method of claim 1, wherein the cutting and/or engraving comprises forming a star shaped pattern about a tip of the jacketed bullet.

5. The method of claim 1, wherein the first predetermined pattern comprises cuts in the front end portion longitudinally oriented in an ogive portion of the jacketed bullet, wherein the cuts define segments in the front end portion.

6. The method of claim 2, further comprising heat treating, cutting, or engraving the front end portion of the jacket with a narrow high energy beam emitted from the high energy beam system in a shape of a second predetermined pattern onto the front end portion.

7. The method of claim 6, further comprising quenching with a gaseous jet.

8. The method of claim 1, further comprising applying a gaseous jet to the front end portion of the jacketed bullet.

9. The method of claim 1, wherein the narrow high energy beam is oriented and fired at a perpendicular angle relative to a tangent of a targeted surface point of the jacket to form the first predetermined pattern and the orientation of the high energy beam is provided by positioning equipment to move the high energy beam about the jacketed bullet.

10. The method of claim 1, wherein the high energy beam system is oriented with respect to a targeted surface point of the jacketed bullet to form the first predetermined pattern, and the orientation is provided by moving the jacketed bullet with respect to the high energy beam system.

11. The method of claim 2, the jacket being made of steel.

12. A jacketed bullet made by the process of claim 1.

13. A method of forming a jacketed bullet having a tip, comprising the steps of:
   a) providing a jacketed bullet with a jacket, a core and a tip;
   b) providing a high energy beam system capable of directing a narrow high energy beam about the tip of the jacketed bullet; and
   c) cutting and/or engraving the jacket of the jacketed bullet about the tip of the jacketed bullet with the narrow high energy beam emitted from the high energy beam system in a shape of a first predetermined pattern, the first predetermined pattern being symmetrical about a longitudinal axis of the jacketed bullet,
   wherein the cutting and/or engraving the jacket in the shape of a first predetermined pattern is controlled by using a control processor comprising an automated computer having storage and operator interface.

14. The method of claim 13, wherein the high energy beam system is an electron beam system.

15. The method of claim 13, further comprising forming a star shaped pattern about the tip of the jacketed bullet with the narrow high energy beam to effect an upset configuration.

16. The method of claim 13, further comprising applying a gaseous jet to the jacketed bullet.

17. The method of claim 13, further comprising swaging or pressing the jacketed bullet after the cutting and/or engraving about the tip of the jacketed bullet.

18. The method of claim 13, wherein the jacketed bullet has a further layer of material amenable to the cutting and/or engraving.

19. A method of processing a bullet having a tip, comprising the steps of:
   a) providing a bullet with a tip;
   b) providing a high energy beam system capable of directing a narrow high energy beam about the tip of the bullet; and
   c) cutting and/or engraving the bullet about the tip of the bullet with the narrow high energy beam emitted from the high energy beam system in a shape of a first predetermined pattern, the first predetermined pattern being symmetrical about the tip and a longitudinal axis of the bullet
   wherein the cutting and/or engraving the bullet in the shape of the first predetermined pattern is controlled by using a control processor comprising an automated computer having storage and operator interface.

20. The method of claim 19, wherein step c) comprises cutting a star shaped pattern about the tip of the bullet with the narrow high energy beam, the star shaped pattern to effect an upset configuration.

21. The method of claim 20, wherein the cutting extends through a jacket of the bullet.

22. The method of claim 19, further comprising applying a gaseous jet to the bullet after the cutting and/or engraving.

* * * * *